US011157839B2

(12) United States Patent
Tran et al.

(10) Patent No.: US 11,157,839 B2
(45) Date of Patent: Oct. 26, 2021

(54) DISTRIBUTION MANAGEMENT FOR PUBLIC TRANSIT VEHICLES

(71) Applicant: International Business Machines Corporation, Armonk, NY (US)

(72) Inventors: Khoi-Nguyen D. Tran, Southbank (AU); Ying Xu, Albion (AU); Nebula Alam, Glenroy (AU); Christopher John Butler, Hawthorn East (AU)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 16/201,432

(22) Filed: Nov. 27, 2018

(65) Prior Publication Data

US 2020/0167697 A1   May 28, 2020

(51) Int. Cl.
*G06Q 10/02* (2012.01)
*G06F 3/14* (2006.01)
*G06K 9/00* (2006.01)
*G06N 5/02* (2006.01)

(52) U.S. Cl.
CPC ............. *G06Q 10/02* (2013.01); *G06F 3/14* (2013.01); *G06K 9/00832* (2013.01); *G06N 5/02* (2013.01)

(58) Field of Classification Search
CPC .......... G06Q 50/30; G06Q 10/02; G06F 3/14; G06K 9/00832; G06N 5/02
See application file for complete search history.

(56) References Cited

U.S. PATENT DOCUMENTS

| 2010/0007525 | A1 | 1/2010 | Shanbhag et al. |
| 2017/0200082 | A1* | 7/2017 | Bohm ..................... G06Q 10/06 |
| 2017/0206201 | A1 | 7/2017 | Chidlovskii |
| 2018/0165783 | A1* | 6/2018 | Edakunni ................ H04L 67/12 |
| 2019/0118838 | A1* | 4/2019 | Lequio .................... G06Q 10/02 |
| 2020/0160631 | A1* | 5/2020 | Ong ...................... G08G 1/0116 |

FOREIGN PATENT DOCUMENTS

| GN | 102354406 A | 2/2012 |
| GN | 106779194 A | 5/2017 |
| JP | 2017522679 A | 8/2017 |

(Continued)

OTHER PUBLICATIONS

Stubenshrott et al., "Real-Time Estimation of Pedestrian Inflow Rates from Saturated Sensor Counting Data in a Complex Metro Station", 2015 IEEE 18th International Conference on Intelligent Transportation Systems (Year: 2015).*

(Continued)

*Primary Examiner* — Emmett K. Walsh
(74) *Attorney, Agent, or Firm* — Jamar K. Ray

(57) ABSTRACT

A method for displaying a visual representation corresponding to a carriage capacity may include obtaining passenger data of passengers onboard a carriage of a multi-carriage vehicle. The method may further include predicting, based at least in part on the first passenger data, a number of passengers who will exit the carriage at a destination. The method may further include determining, based at least in part on the predicting, an available capacity for the carriage and generating a visual representation that corresponds to the available capacity. The method may further include displaying the visual representation at the destination of the multi-carriage vehicle.

20 Claims, 5 Drawing Sheets

(56) References Cited

FOREIGN PATENT DOCUMENTS

KR   101793845 B1 11/2017
WO   2016092687 A1 6/2016

OTHER PUBLICATIONS

Ahn et al., "Real-time Information System for Spreading Rail Passengers across Train Carriages: Agent-based Simulation Study," http://atrf.info/papers/2016/files/ATRF2016_Full_papers_resubmission_194.pdf, Australasian Transport Research Forum 2016 Proceedings, Nov. 16-18, 2016, 13 pgs.
Douglas Economics, "Modelling Train & Passenger Capacity," Report to Transport for NSW, http://images.smh.com.au/file/2013/09/23/4770519/trains.pdf, Jul. 2012, 72 pgs.
DTI Group, "Video Passenger Counting," http://www.dti.com.au/product-features/video-data-analytics/passenger-counting/, printed Oct. 30, 2018, 1 pg.
Lopez et al., "Passenger Density Measurement in a Train Carriage Using Image Processing," https://www.sciencedirect.com/science/article/pii/S1474667017439450, © IFAC Transportation Systems, Chania, Greece, 1997, 6 ogs.
Mell et al., "The NIST Definition of Cloud Computing," Recommendations of the National Institute of Standards and Technology, U.S. Department of Commerce, Special Publication 800-145, Sep. 2011, 7 pgs.

* cited by examiner

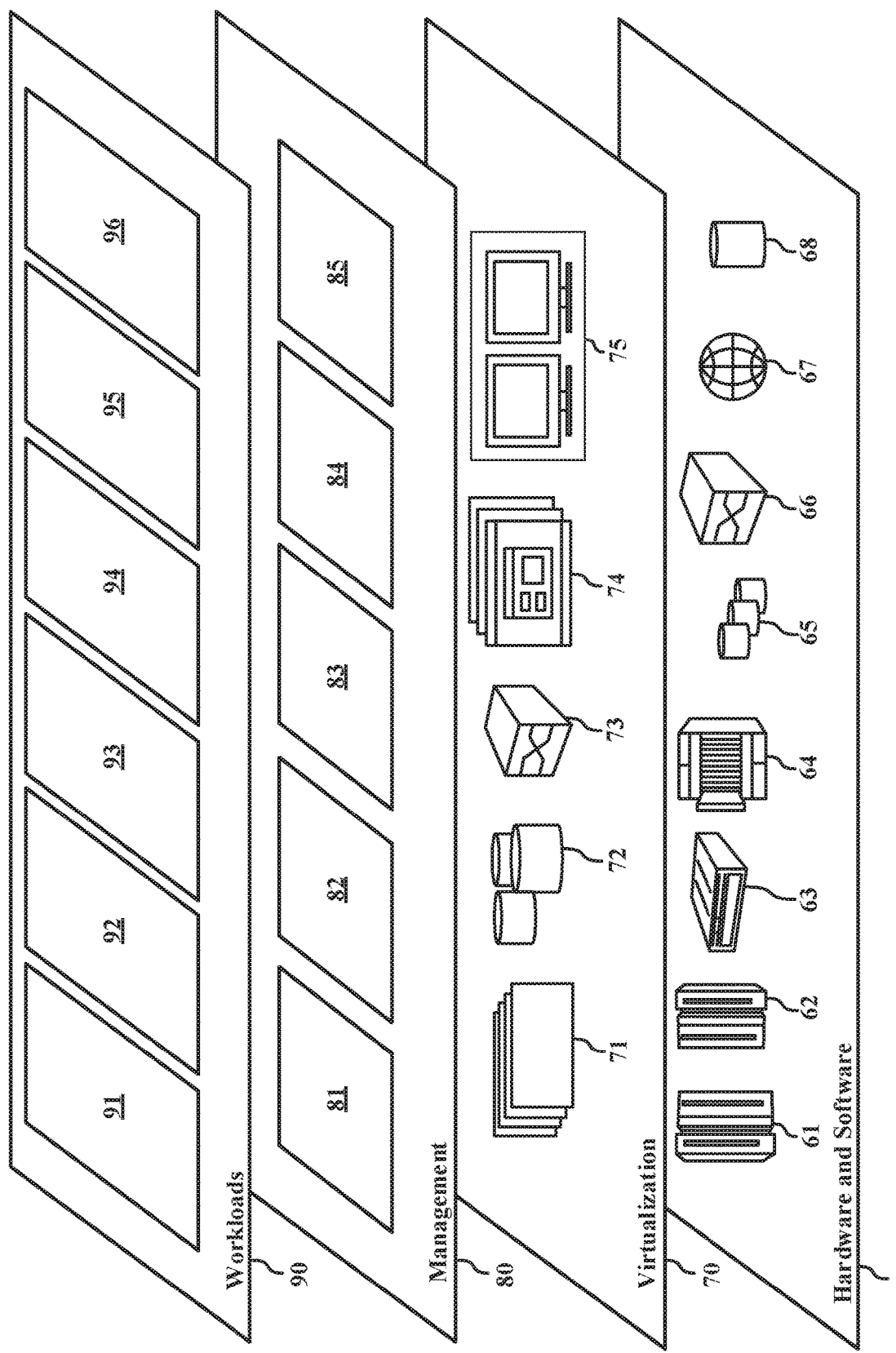

DISTRIBUTION MANAGEMENT FOR PUBLIC TRANSIT VEHICLES

BACKGROUND

The present disclosure relates to computer systems, and more specifically, to systems for handling passenger distribution for multi-carriage vehicles.

Using a multi-carriage vehicle may involve waiting for the vehicle at a destination with multiple passengers and riding onboard the vehicle with multiple passengers. Passengers may self-distribute according to their needs while waiting.

SUMMARY

Some embodiments of the present disclosure can be illustrated as a method for displaying a visual representation corresponding to a carriage capacity. The method may include obtaining first passenger data of a first set of passengers. The first set of passengers may be onboard a first carriage of a multi-carriage vehicle. The multi-carriage vehicle may have a destination. The method may further include predicting, based at least in part on the first passenger data, a number of the first set of passengers who will exit the first carriage at the destination. The method may further include determining, based at least in part on the predicting, a first available capacity for the first carriage. The method may further include generating a first visual representation that corresponds to the first available capacity. The method may further include displaying the first visual representation at the destination.

Some embodiments of the present disclosure can be illustrated as a system comprising a processor and a memory in communication with the processor, the memory containing program instructions that, when executed by the processor, are configured to cause the processor to perform the aforementioned method.

Some embodiments of the present disclosure can be illustrated as a computer program product, the computer program product comprising a computer readable storage medium having program instructions embodied therewith, the program instructions executable by a computer to cause the computer to perform the aforementioned method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 depicts abstraction model layers according to an embodiment of the present invention.

Figure 1:
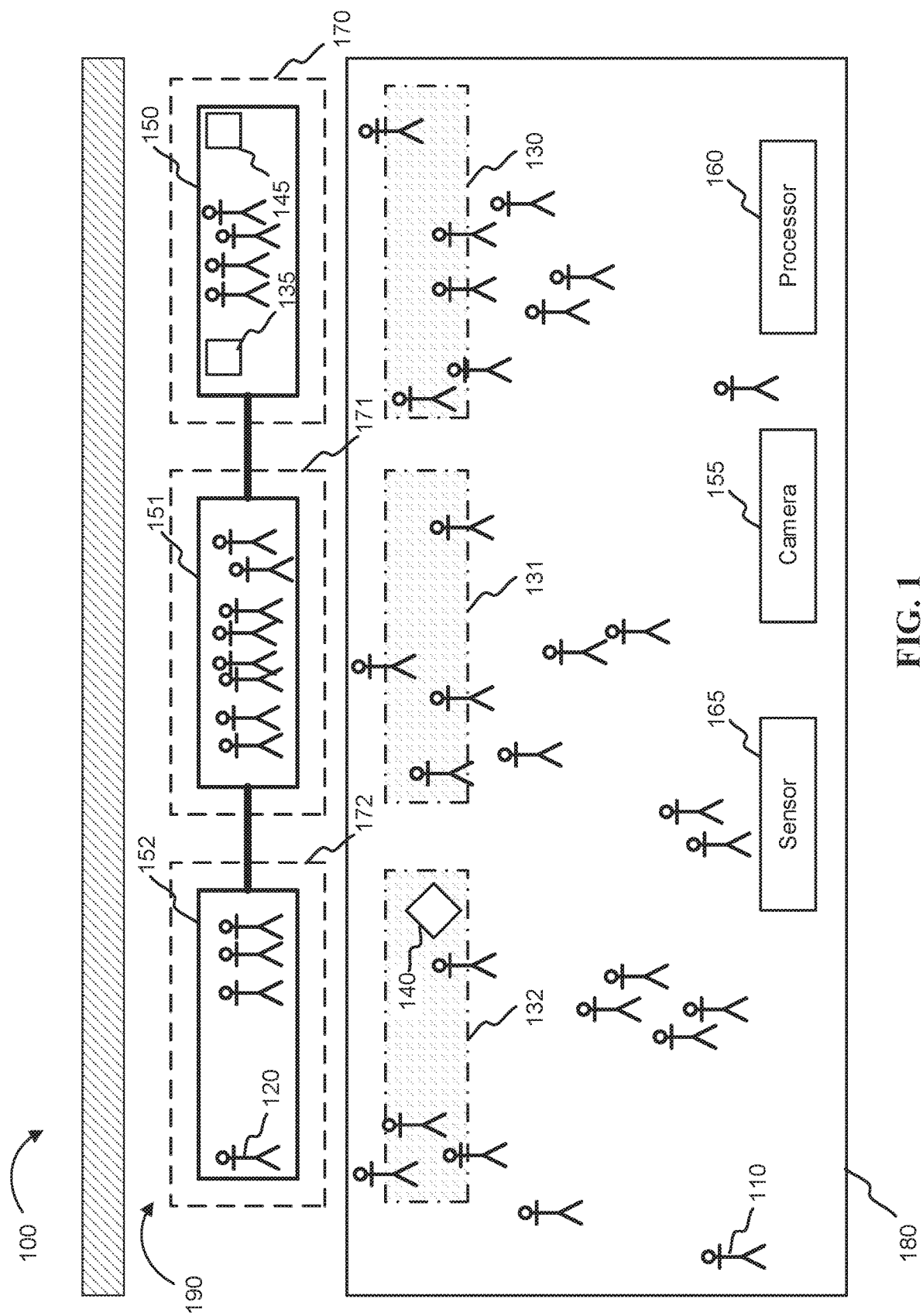
FIG. 1 depicts an example of a system for facilitating passenger distribution, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer systems; more particular aspects relate to systems for controlling crowd distribution for multi-carriage vehicles. While the present disclosure is not necessarily limited to such applications, various aspects of the disclosure may be appreciated through a discussion of various examples using this context.

Multi-carriage vehicles, such as subway trains, trolleys, and trams, may sustain periods of high passenger traffic. During these periods, the large number of passengers may contribute to uneven and inefficient distributions of passengers on vehicle carriages and in the waiting areas for vehicle carriages. Furthermore, during these periods crowding may increase the difficulty of passengers finding a carriage that accommodates the passengers' needs. As a result, inefficient boarding and exiting of carriages may lead to vehicle schedule delays and an unpleasant experience for passengers.

To address these and other problems, embodiments of the present disclosure include a method to facilitate passenger distribution for efficient use of multi-carriage vehicles.

Embodiments of the present disclosure include obtaining first passenger data of a first set of passengers onboard a first carriage of a multi-carriage vehicle that is approaching a destination. The first passenger data may include information associated with the first set of passengers and/or information associated with the first carriage itself, such as the number of the first set of passengers, a carriage-type designation, audio and/or video recordings of the first set of passengers, and/or itinerary data of the first set of passengers. The first passenger data may be used to predict the number of passengers who will exit the first carriage at the destination. Then, the predicted number may be used to determine an estimated available capacity for the first carriage. The determined available capacity may indicate the amount of passenger space that will be available within the first carriage after the predicted number of first passengers exits the first carriage at the destination. A first visual representation that corresponds with the determined available capacity may be generated and displayed at the destination before the first carriage arrives at the destination.

This display of the first visual representation at the destination may permit a second set of passengers at the destination to self-distribute about a waiting area according to their needs. For example, a visual representation may include a carriage-type designation, such as a wheelchair-accessible designation, that would permit a passenger having such a need to self-distribute near a stopping location for the wheelchair-accessible carriage. Additionally, the display of the first visual representation may permit the second set of passengers to self-distribute to avoid a crowded transition between first passengers exiting a carriage at the destination and second passengers boarding the carriage at the destination.

For example, a visual representation showing that an arriving carriage is at full capacity may encourage passenger(s) awaiting the multi-carriage vehicle (e.g., train) to self-distribute near a stopping position of an arriving carriage that is empty. Accordingly, embodiments of the present disclosure may permit efficient boarding and exiting of multi-carriage vehicles. As a result, embodiments of the present disclosure may improve the experience of traveling on multi-carriage vehicles in addition to improving the overall operating efficiency of multi-carriage vehicles. Additionally, since the visual representation may be perceived without the user needing specific technology, such as a smart phone, embodiments of the present disclosure may provide information in a way that is easily accessible to all passengers at the destination.

Additionally, some embodiments of the present disclosure include monitoring a set of second passengers at a destination to obtain second passenger data. The second passenger data may be used to estimate a number of passengers who will board an arriving carriage, and the visual representation may be updated in real-time to include the estimation. This updating of the visual representation may further enhance self-distribution efficiency by permitting passengers at the destination to adjust their position based on the movements of other passengers, thereby reducing bottlenecking that occurs when, for example, a large number of passengers try to board a carriage with insufficient capacity.

It is to be understood that the aforementioned advantages are example advantages and should not be construed as limiting. Embodiments of the present disclosure can contain all, some, or none of the aforementioned advantages while remaining within the spirit and scope of the present disclosure.

Turning to the figures, FIG. 1 depicts an example operating environment 100 in which illustrative examples of the present disclosure may be implemented. Operating environment 100 may be a destination, such as a subway station, train depot, or a tram terminal, where a multi-carriage vehicle 190 may arrive for passenger boarding and exiting. Multi-carriage vehicle 190 may be a vehicle, such as a trolley, train, or tram, having multiple passenger carriages 150, 151, 152.

Each carriage 150, 151, 152 may be equipped with one or more cameras 145 and/or one or more sensors 135. The cameras 145 may be configured to obtain images and/or audio recordings of a first set of passengers 120 distributed within each carriage 150, 151, 152. The sensors 135 may include a variety of types, such as seat occupant sensors, carriage weight sensors, wireless device detectors, and motion sensors. The cameras 145 and sensors 135 may be configured to obtain data about the first set of passengers 120 onboard each carriage 150, 151, 152. Such data may include information such as a total number of passengers on the carriage, a number of seated passengers, a density of passengers positioned in a particular portion of the carriage (e.g., near the doors where they would exit at the next stop), and/or a direction of motion of one or more passengers. Furthermore, the cameras 145 and the sensors 135 may be connected to one or more processors that may analyze and/or process data obtained from the cameras and the sensors. Furthermore, the processors may receive other data, such as passenger itinerary data, from the passengers themselves (e.g., from a wireless communication link with their phone) or from a remote server (e.g., a server that maintains booking information for the multi-carriage vehicle).

For example, in some embodiments, a carriage may be equipped with a wireless device detector that may provide an approximate number of wireless devices present on the carriage. That number may be transmitted to a processor to aid in determining how many passengers are onboard the carriage. In some embodiments, camera image data may be transmitted to a processor for image analysis to aid in predicting a number of passengers onboard the carriage who are likely to exit at the destination. For example, the processor may analyze a set of images to determine a number of people in an area that indicates they may be preparing to get off the train (e.g., near the door) and/or to determine a number of people moving towards the doors (e.g., by analysis of video).

Additionally, each carriage may be designated to offer one or more features, such as wireless internet access, wheelchair accessibility, or quiet space (e.g., where talking or otherwise making noise are strongly discouraged).

A second set of passengers 110 may be distributed about a waiting platform 180 within the operating environment 100. Furthermore, a visual representation 130, 131, 132 may be viewable to the second set of passengers 110. The visual representation 130, 131, 132 may include information that corresponds to a specific carriage of the multi-carriage vehicle. For example, the visual representation may include an indicator 140 (e.g., a wireless communication icon) that shows a feature that is available on the corresponding carriage (e.g., available wireless internet access). The visual representation may also include information such as a number of first passengers onboard a carriage, an available capacity of a carriage, and/or a predicted departure capacity of a carriage (i.e., a predicted capacity of the carriage after passengers have had an opportunity to exit and board the carriage at the destination). Each carriage 150, 151, 152 may have a distinct, corresponding visual representation 130, 131, 132 that may be displayed approximately adjacent to an approximate stopping position 170, 171, 172 of the carriage at the destination 100.

For example, in FIG. 1, a first carriage 152 has an approximate stopping position 172 at the destination 100. Adjacent to stopping position 172, visual representation 132 may include information corresponding to the first carriage 152, such as which features are available on the first carriage 152 and/or a predicted departure capacity of the first carriage 152. This configuration permits the second set of passengers (e.g., the passengers waiting to board the multi-carriage vehicle) to easily match each carriage with its corresponding carriage data and self-distribute accordingly.

The visual representations 130, 131, 132 may take one or more forms, including without limitation a set of colors or patterns, a set of images, a set of alphanumeric characters, and/or a set of audio sounds. Additionally, the visual representations may be displayed in a variety of ways. For example, in some embodiments, a visual representation may include a projection onto a surface within the operating environment (e.g., a projection onto a surface of the waiting platform 180). In some embodiments, a visual representation may include a set of electronic display screens within the operating environment. In some embodiments, a visual representation may include an illuminated section of a structure within the operating environment, such as an illuminated section of a floor, wall, and/or ceiling. In some embodiments, a visual representation may include a projection onto a carriage or an illumination of a portion of a carriage of a multi-carriage vehicle. In some embodiments, the visual representation may include illuminating (e.g., by projection, embedded lights, etc.) a set of doors that block off access to the tracks when the train is not in the station, such as may be found in airports or subways.

In some embodiments, there may be multiple sets of visual representations. Each set may correspond to a different multi-carriage vehicle that is scheduled to arrive at the destination. For example, a first set of visual representations (e.g., the set nearest the tracks) may correspond to the first (e.g., next) arriving train. A second set of visual representations (e.g., a set further away from the tracks or located in another area) may correspond to a second arriving train. The second arriving train may be scheduled to arrive after the first arriving train has departed from the destination. Accordingly, passengers who are not boarding the first arriving train may nevertheless begin self-distributing for the second arriving train.

In some embodiments, the operating environment may include a set of sensors 165 and a set of cameras 155 configured to obtain second passenger data about the second set of passengers at the waiting platform. The sensors 165 may include a variety of types, such as wireless device detectors and/or motion sensors. The second passenger data may include information pertaining to the passengers waiting at the platform, such as a total number of second passengers and/or a direction of motion of one or more second passengers. Furthermore, the cameras 155 and the sensors 165 may be connected to one or more processors that may analyze and/or process data obtained from the cameras and the sensors. Using the second passenger data, the processor may update the visual representations in real-time based on a current passenger distribution of the second passengers (e.g., based on where passengers are currently queued for boarding the train). For example, even if an approaching carriage is completely empty, if the number of passengers lined up to get on that carriage exceeds the capacity of the carriage, the visual representation may be updated to encourage additional passengers to move towards another carriage.

In some embodiments, the operating environment 100 may further include a processor 160. The processor 160 may communicate with an array of devices, such as one or more external storage and/or processing devices, such as one or more servers. The processor may communicate with sensors 135, cameras 145, and/or equipment (not shown) used to display the visual representation 130, 131, 132. In some embodiments, the processor 160 may communicate with one or more processors on the multi-carriage vehicle. In some embodiments, the processor 160 may be located remotely located from the operating environment.

Figure 2:
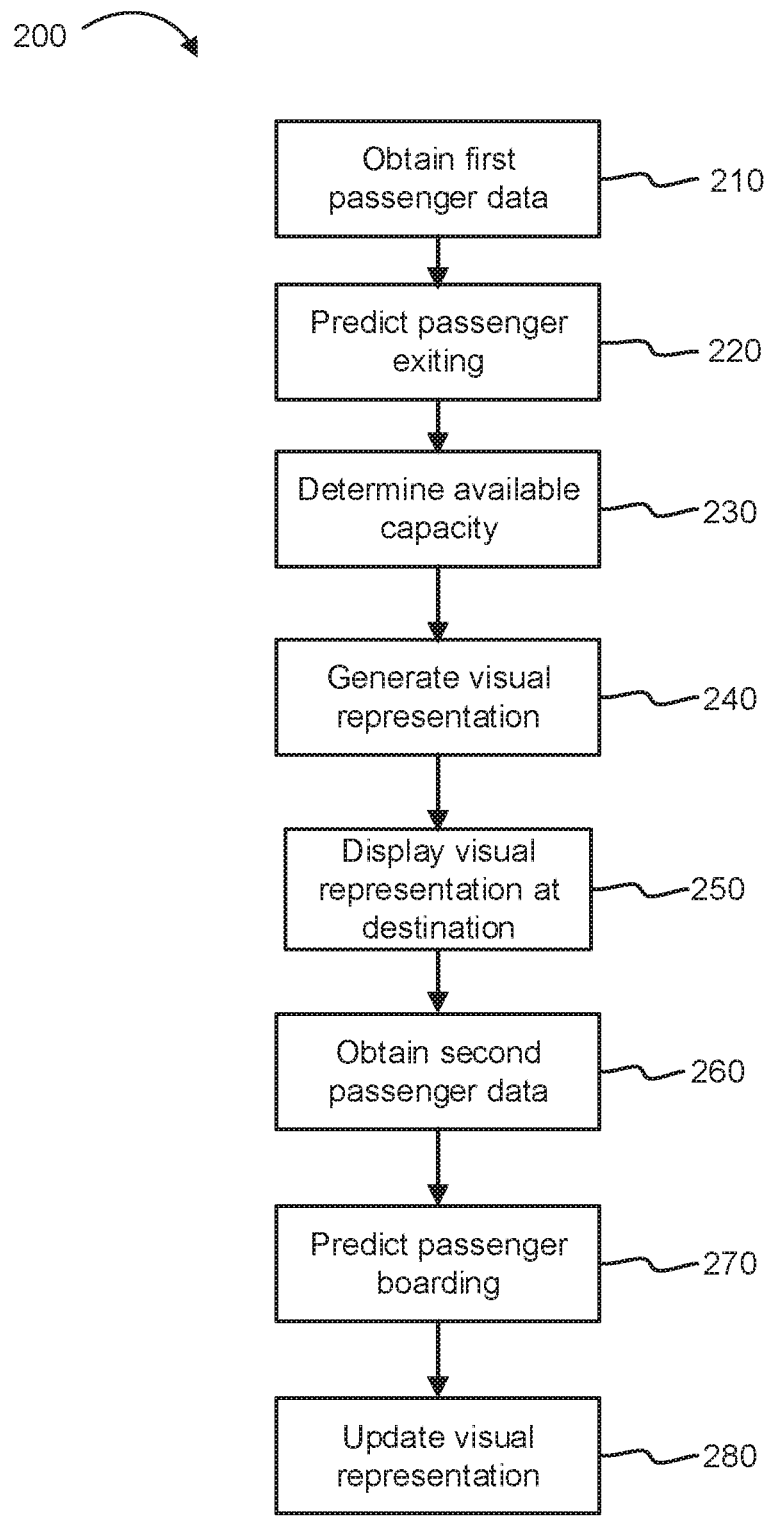
FIG. 2 depicts a flowchart of an example method for facilitating passenger distribution, in accordance with embodiments of the present disclosure.

FIG. 2 depicts an embodiment of an example method 200 for facilitating passenger distribution, in accordance with embodiments of the present disclosure. The method 200 may be performed (e.g., automatically) by a computer system (e.g., computer system 301 shown in FIG. 3). The method 200 may begin at step 210, where first passenger data of passengers onboard a carriage of the multi-carriage vehicle may be obtained. The first passenger data may be obtained from one or more sensors or cameras connected to the multi-carriage vehicle. The first passenger data may also be obtained from one or more storage and/or processing devices in communication with one or more sensors or cameras connected to the multi-carriage vehicle. In some embodiments, step 210 may include obtaining historical data regarding the multi-carriage vehicle from one or more storage and/or processing devices. For example, historical data may include information such as previously acquired sensor or camera data, statistical data regarding passenger activity at a particular time of day, a predetermined maximum passenger capacity for each carriage, and/or data regarding a feature available on the carriage.

Step 220 includes predicting a number of passengers who will exit the carriage at a travel destination of the carriage. Step 220 may include analyzing the first passenger data. For example, step 220 may include determining a number of passengers who transition from a seated position to a standing position as the carriage approaches a destination. This transition may be determined by analyzing a set of seat occupant sensors (e.g. by analyzing a quantity of sensors that transitioned from indicating that a seat was occupied to indicating that a seat became unoccupied). In another example, images of passengers may show a number of standing passengers who move toward a carriage doorway as the carriage approaches a destination. Using the number of passengers at (or moving toward) the carriage doorway, a computer system may predict how many passengers are exiting at the next stop. In some embodiments, the computer system may use the sensor data and the historical data to predict the number of passengers exiting the carriage. Other sensors, such as sensors placed near the doors that can detect the number of passengers at the doors or the change in the number of passengers at the doors, may similarly be used to predict the number of passengers exiting the carriage.

Step 230 includes determining an available passenger capacity onboard the carriage. For example, determining an available capacity may include subtracting a number of passengers onboard the carriage from a predetermined maximum passenger capacity for the carriage, and from the result, adding the predicted number of passengers who will exit the carriage.

Step 240 includes generating a visual representation to be displayed at the destination. For example, step 240 may include a set of computer commands to associate a set of variables with carriage-specific data (e.g., FEATURE="Quiet Space Carriage", AVAILABLE CAPACITY=20) that will be included in the visual representation. Step 240 may also include transmitting data that is to be displayed at the destination.

In some embodiments, step 240 includes generating one or more visual indicators for each carriage. The visual indicators may indicate the features of the carriage (e.g., amenities such as internet access), as well as the predicted available capacity for new passengers (e.g., passengers waiting at the next stop) based on the current capacity and the number of passengers expected to exit the carriage. In some embodiments, the amenities features may be predicted amenities available to passengers waiting to get on the carriage. For example, if a carriage has two wheelchair accessible seating areas, but both are unlikely to be available at the next stop, the visual indicator displayed may not show the carriage as being wheelchair accessible, or it may show that the carriage is wheelchair accessible, but that it is at capacity.

The visual indicators may be generated using one or more thresholds. For example, the system may be configured to display three levels of available capacity using color LEDs: Red for carriages with >80% of the total capacity occupied (e.g., high occupancy), yellow for carriages with between 40% and 80% of the total capacity occupied (e.g., moderate occupancy), and green for carriages with under 40% of the total capacity occupied (e.g., low occupancy). The system may compare the predicted capacity for each carriage to the thresholds to determine which color corresponds to each carriage, and then displays the colors at the destination (e.g., the next stop).

In some embodiments, the thresholds may be based on historical data and/or current capacity of the multi-carriage vehicle as a whole. For example, during peak hours where the train is generally near full, the threshold may be changed to 90 and 75 percent capacity to reflect the fact that each carriage is likely to be more full than usual, and any carriage with less than 75% of the total capacity occupied is, relatively speaking, an open carriage. Similarly, during low occupancy hours, the thresholds may be adjusted downward (e.g., to 50% and 25%).

Step 250 includes displaying the visual representation at the destination. During step 250, data corresponding to the carriage is made visible to a second set of passengers at the destination. Step 250 may include actions such as illuminating a set of display screens and/or projecting a set of patterns or images. Step 250 may also include emitting a set of audio sounds at the destination. Additionally, step 250 may occur before the multi-carriage vehicle arrives at the destination to allow passengers to self-distribute in a more efficient manner.

Step 260 includes obtaining second passenger data of a second set of passengers at the destination. The second passenger data may be obtained from one or more sensors or cameras at the destination. The second passenger data may also be obtained from one or more storage and/or processing devices in communication with one or more sensors or cameras at the destination. For example, the second passenger data may include itinerary data for passengers at the platform. In some embodiments, step 260 may include obtaining historical data regarding passenger transit activity at the destination from one or more storage and/or processing devices.

For example, step 260 may include using a set of cameras and a set of weight sensors arranged at a destination to monitor in real-time how the second set of passengers are self-distributing about a waiting platform at the destination. Additionally, historical data may be obtained, such as whether the destination is typically crowded at a particular time of day.

Step 270 includes estimating a number of passengers who will board a carriage at the destination. Step 270 may also include predicting a departure capacity (i.e., a capacity of the carriage after first passengers and second passengers have had an opportunity to exit and board the carriage at the destination). Estimating a number of passengers who will board the carriage may include analyzing the second passenger data. For example, a processor may utilize machine learning to estimate, based on a passenger's movement patterns and stationary locations at a waiting platform, whether the passenger is likely to board an approaching carriage.

Step 280 includes updating the visual representation based on the estimated number of passengers who will board the carriage at the destination. For example, a set of second passengers at a destination may observe a visual representation regarding an approaching three-carriage vehicle having carriage 1, carriage 2, and carriage 3. The visual representation indicates that carriage 1 has the highest available capacity, followed, in order of descending capacity, by carriage 2 and then carriage 3. Since the visual representation shows that carriage 1 has the highest available capacity, a large number of the second passengers self-distribute adjacent to the stopping position of carriage 1. The changed distribution of second passengers is detected by a set of sensors and cameras at the destination. A processor analyzes the sensor and camera data, estimates that a large number of second passengers will board carriage 1, and updates the display. The updated display shows that the predicted departure capacity of carriage 1 is at full capacity and that the predicted departure capacity of carriage 2 is at medium capacity. When some of the second passengers observe the predicted departure capacities, they reposition themselves adjacent to the stopping position of carriage 2, with intent to board a carriage with a lower predicted departure capacity. As the second passengers continue to self-distribute, the visual representations are continuously updated, such that when the multi-carriage vehicle arrives, the second passengers may be self-distributed according to their needs and/or preferences.

Figure 3:
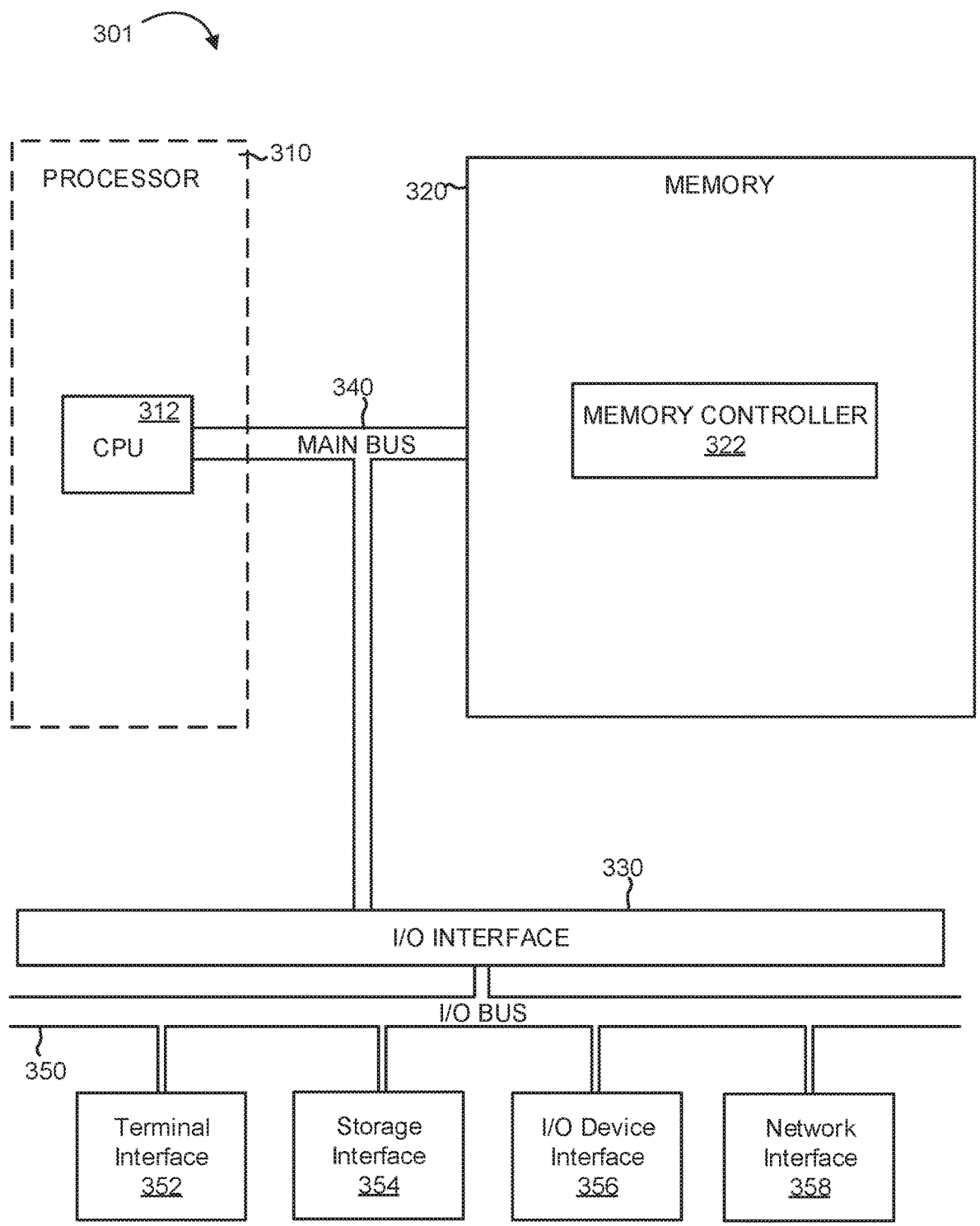
FIG. 3 depicts the representative major components of a computer system that may be used in accordance with embodiments of the present disclosure.

FIG. 3 depicts the representative major components of an exemplary Computer System 301 (e.g., for predicting and displaying carriage availability) that may be used in accordance with embodiments of the present disclosure. The particular components depicted are presented for the purpose of example only and are not necessarily the only such variations. The Computer System 301 may comprise a Processor 310, Memory 320, an Input/Output Interface (also referred to herein as I/O or I/O Interface) 330, and a Main Bus 340. The Main Bus 340 may provide communication pathways for the other components of the Computer System 301. In some embodiments, the Main Bus 340 may connect to other components such as a specialized digital signal processor (not depicted).

The Processor 310 of the Computer System 301 may be comprised of one or more CPUs 312. The Processor 310 may additionally be comprised of one or more memory buffers or caches (not depicted) that provide temporary storage of instructions and data for the CPU 312. The CPU 312 may perform instructions on input provided from the caches or from the Memory 320 and output the result to caches or the Memory 320. The CPU 312 may be comprised of one or more circuits configured to perform one or methods consistent with embodiments of the present disclosure. In some embodiments, the Computer System 301 may contain multiple Processors 310 typical of a relatively large system. In other embodiments, however, the Computer System 301 may be a single processor with a singular CPU 312.

The Memory 320 of the Computer System 301 may be comprised of a Memory Controller 322 and one or more memory modules for temporarily or permanently storing data (not depicted). In some embodiments, the Memory 320 may comprise a random-access semiconductor memory, storage device, or storage medium (either volatile or non-volatile) for storing data and programs. The Memory Controller 322 may communicate with the Processor 310, facilitating storage and retrieval of information in the memory modules. The Memory Controller 322 may communicate with the I/O Interface 330, facilitating storage and retrieval of input or output in the memory modules. In some embodiments, the memory modules may be dual in-line memory modules.

The I/O Interface 330 may comprise an I/O Bus 350, a Terminal Interface 352, a Storage Interface 354, an I/O Device Interface 356, and a Network Interface 358. The I/O Interface 330 may connect the Main Bus 340 to the I/O Bus 350. The I/O Interface 330 may direct instructions and data from the Processor 310 and Memory 320 to the various interfaces of the I/O Bus 350. The I/O Interface 330 may also direct instructions and data from the various interfaces of the I/O Bus 350 to the Processor 310 and Memory 320. The various interfaces may comprise the Terminal Interface 352, the Storage Interface 354, the I/O Device Interface 356, and the Network Interface 358. In some embodiments, the various interfaces may comprise a subset of the aforementioned interfaces (e.g., an embedded computer system in an industrial application may not include the Terminal Interface 352 and the Storage Interface 354).

Logic modules throughout the Computer System 301—including but not limited to the Memory 320, the Processor 310, and the I/O Interface 330—may communicate failures and changes to one or more components to a hypervisor or operating system (not depicted). The hypervisor or the operating system may allocate the various resources available in the Computer System 301 and track the location of data in Memory 320 and of processes assigned to various CPUs 312. In embodiments that combine or rearrange elements, aspects of the logic modules' capabilities may be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
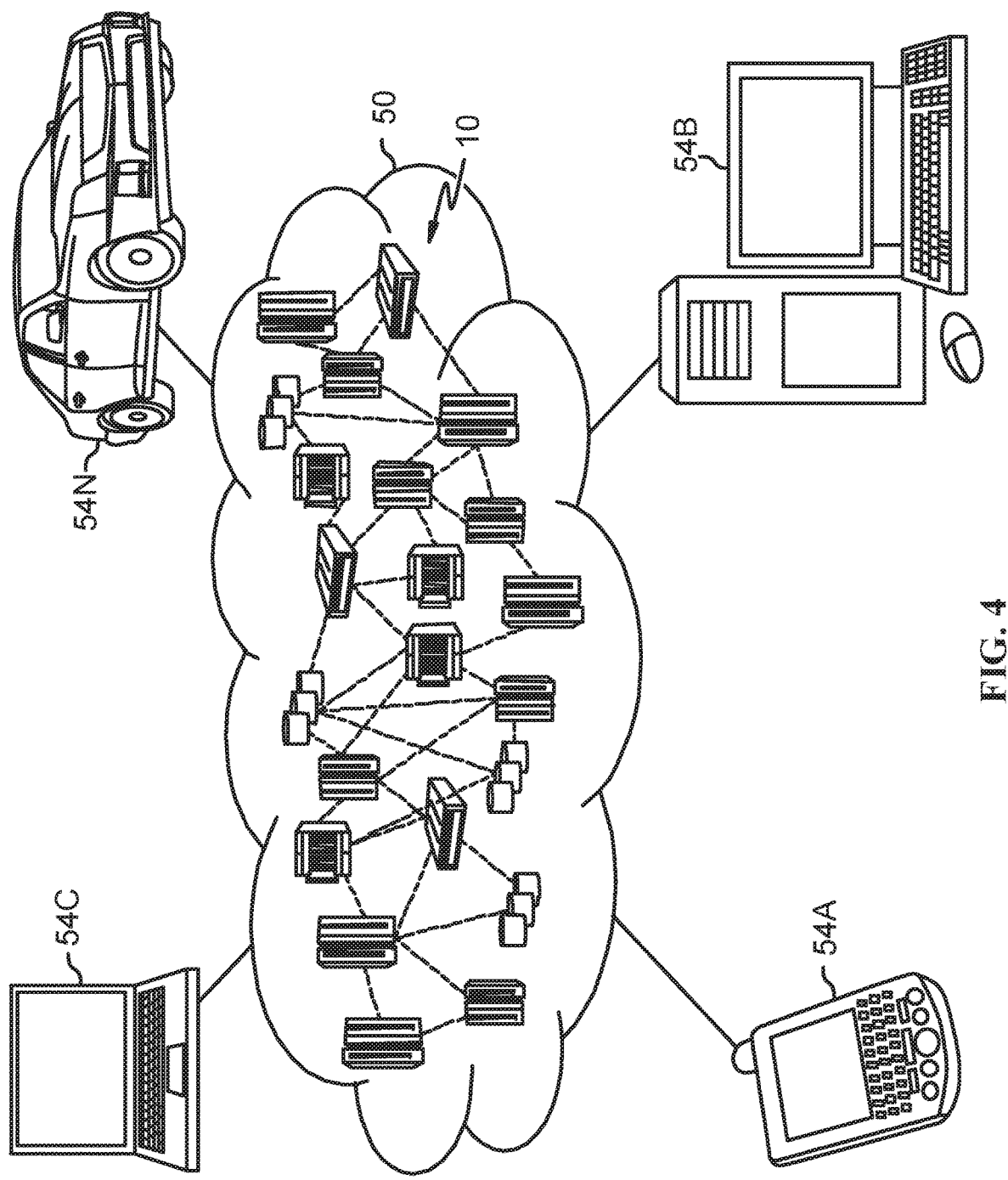
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and capacity prediction logic 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
obtaining first passenger data of a first set of passengers onboard a first carriage of a multi-carriage vehicle, the multi-carriage vehicle having a destination;
predicting, based at least in part on the first passenger data, a number of the first set of passengers who will exit the first carriage at the destination;
determining, based at least in part on the predicting, a first available capacity for the first carriage;
generating a first visual representation that corresponds to the first available capacity;
displaying, at a first time, the first visual representation at the destination, the first visual representation visible on a surface of a first ground region at the destination;
obtaining, at a second time subsequent to the first time, by one or more devices at the destination, second passenger data of a second set of passengers at the destination, the second set of passengers not onboard the multi-carriage vehicle, the second passenger data comprising a first position of the second set of passengers;
updating, at a third time subsequent to the second time, the first visual representation based on the second passenger data;
obtaining, at a fourth time subsequent to the third time, by the one or more devices at the destination, third passenger data of the second set of passengers, the third passenger data comprising a second position of the second set of passengers, the second position different from the first position; and
updating, at a fifth time subsequent to the fourth time, the first visual representation based on the third passenger data, wherein the one or more devices are selected from the group consisting of cameras and sensors.

2. The method of claim 1, wherein the first visual representation is visible to the second set of passengers.

3. The method of claim 1, wherein the updating at the fifth time occurs before the multi-carriage vehicle arrives at the destination.

4. The method of claim 1, further comprising transmitting the first available capacity over a network to a receiving device.

5. The method of claim 1, wherein the first visual representation is visible adjacent to a stopping position of the first carriage at the destination.

6. The method of claim 2, further comprising estimating a number of the second set of passengers who will board the multi-carriage vehicle at the destination.

7. The method of claim 6, wherein the updating at the third time comprises adjusting the first visual representation based on the estimating.

8. The method of claim 1, wherein the first visual representation further includes an indicator that describes a feature available on the first carriage.

9. A system comprising:
a memory; and
a processor communicatively coupled to the memory, wherein the processor is configured to perform a method comprising:
obtaining first passenger data of a first set of passengers onboard a first carriage of a multi-carriage vehicle, the multi-carriage vehicle having a destination;
predicting, based at least in part on the first passenger data, a number of the first set of passengers who will exit the first carriage at the destination;
determining, based at least in part on the predicting, a first available capacity for the first carriage;
generating a first visual representation that corresponds to the first available capacity;
displaying, at a first time, the first visual representation at the destination, the first visual representation visible on a surface of a first ground region at the destination;
obtaining, at a second time subsequent to the first time, by one or more devices at the destination, second passenger data of a second set of passengers at the destination, the second set of passengers not onboard the multi-carriage vehicle, the second passenger data comprising a first position of the second set of passengers;
updating, at a third time subsequent to the second time, the first visual representation based on the second passenger data;
obtaining, at a fourth time subsequent to the third time, by the one or more devices at the destination, third passenger data of the second set of passengers, the third passenger data comprising a second position of the second set of passengers, the second position different from the first position; and
updating, at a fifth time subsequent to the fourth time, the first visual representation based on the third passenger data,
wherein the one or more devices are selected from the group consisting of cameras and sensors.

10. The method of claim 1, wherein the first visual representation further comprises a predicted departure capacity corresponding to the first carriage; and
wherein the updating at the fifth time comprises updating the predicted departure capacity for the first carriage.

11. The system of claim 9, wherein the first visual representation is visible to the second set of passengers.

12. The system of claim 11, wherein the method performed by the processor further comprises estimating a number of the second set of passengers who will board the multi-carriage vehicle at the destination.

13. The system of claim 12, wherein the updating at the third time comprises adjusting the first visual representation based on the estimating.

14. The system of claim 9, wherein the updating at the fifth time occurs before the multi-carriage vehicle arrives at the destination.

15. The system of claim 9, wherein the method performed by the processor further comprises transmitting the first available capacity over a network to a receiving device.

16. The system of claim 9, wherein the first visual representation is visible adjacent to a stopping position of the first carriage at the destination.

17. A computer program product comprising a computer readable storage medium having program instructions embodied therewith, the program instructions executable by a processor to cause the processor to perform a method comprising:
obtaining first passenger data of a first set of passengers onboard a first carriage of a multi-carriage vehicle, the multi-carriage vehicle having a destination;
predicting, based at least in part on the first passenger data, a number of the first set of passengers who will exit the first carriage at the destination;
determining, based at least in part on the predicting, a first available capacity for the first carriage;
generating a first visual representation that corresponds to the first available capacity;
displaying, at a first time, the first visual representation at the destination, the first visual representation visible on a surface of a first ground region at the destination;
obtaining, at a second time subsequent to the first time, by one or more devices at the destination, second passenger data of a second set of passengers at the destination, the second set of passengers not onboard the multi-carriage vehicle, the second passenger data comprising a first position of the second set of passengers;
updating, at a third time subsequent to the second time, the first visual representation based on the second passenger data;
obtaining, at a fourth time subsequent to the third time, by the one or more devices at the destination, third passenger data of the second set of passengers, the third passenger data comprising a second position of the second set of passengers, the second position different from the first position; and
updating, at a fifth time subsequent to the fourth time, the first visual representation based on the third passenger data,
wherein the one or more devices are selected from the group consisting of cameras and sensors.

18. The computer program product of claim 17, wherein the first visual representation is visible to the second set of passengers.

19. The computer program product of claim 18, wherein the method performed by the processor further comprises estimating a number of the second set of passengers who will board the multi-carriage vehicle at the destination.

20. The computer program product of claim 19, wherein the updating at the third time comprises adjusting the first visual representation based on the estimating.

* * * * *